United States Patent Office 2,958,333
Patented Nov. 1, 1960

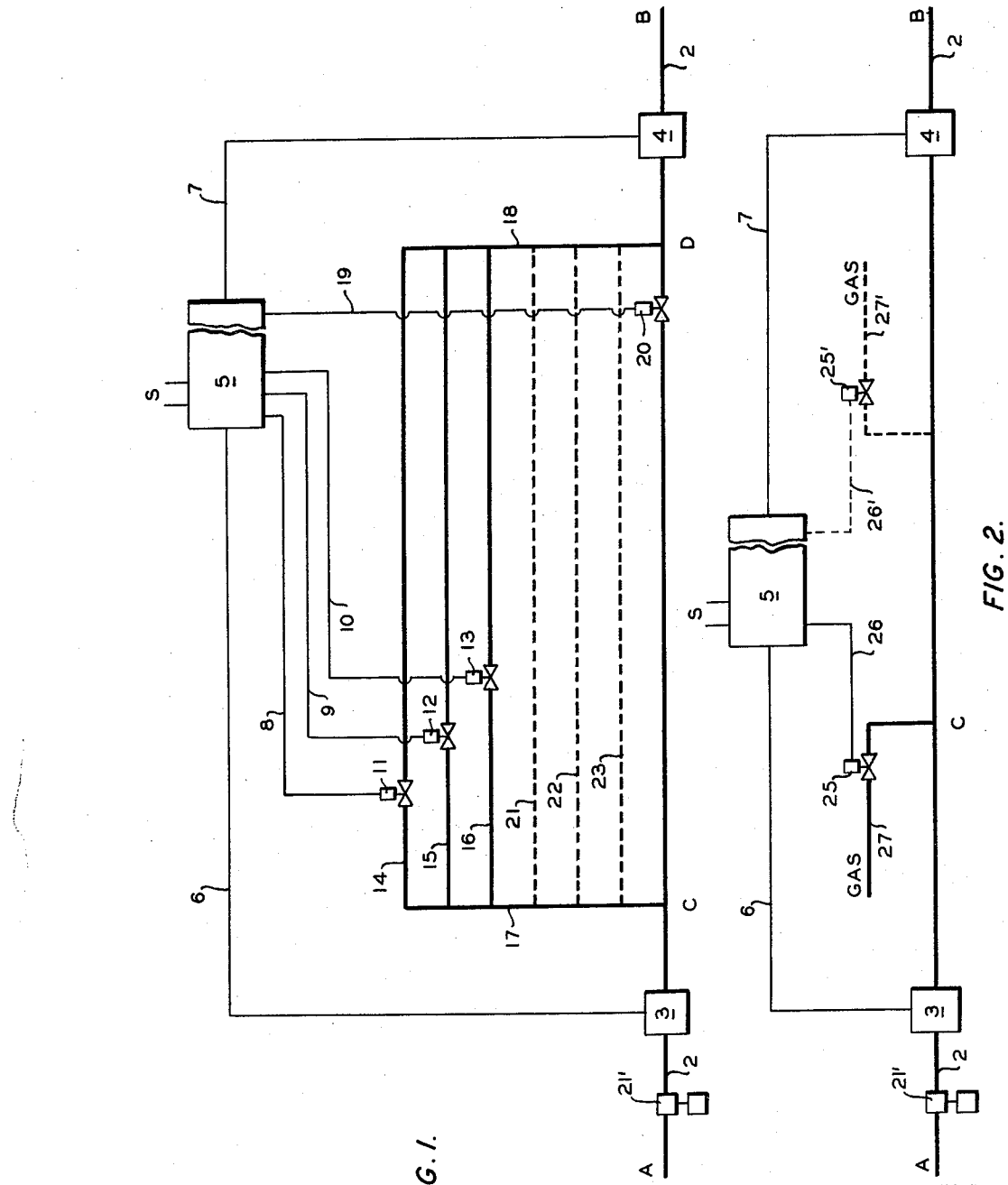

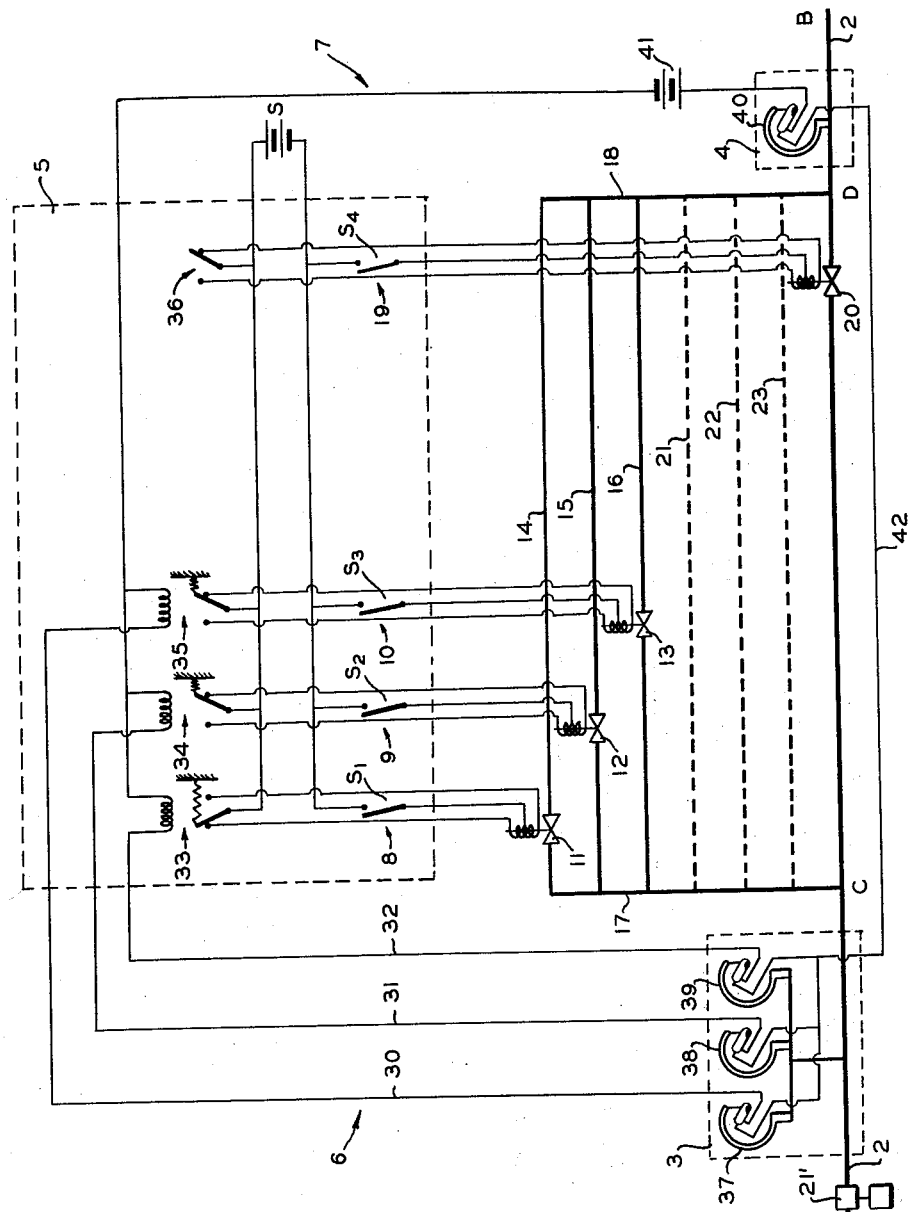

2,958,333

PIPE LINE TRANSPORTATION OF A MULTIPLE FLUID

Fred H. Poettmann and Mehmet R. Tek, Bartlesville, Okla., assignors to Phillips Petroleum Company, a corporation of Delaware Filed Jan. 19, 1955, Ser. No. 482,907

11 Claims. (Cl. 137—3)

This invention relates to the prevention of fluid accumulation in pipe lines. In one of its aspects, the invention relates to a method for the prevention of phase separation or fluid accumulation in a pipe line by increasing the turbulence in said pipe line. In another aspect of the invention, turbulence in a pipe line is increased by measuring the pressure drop in said pipe line and introducing a pressuring fluid to increase the pressure drop therein. In another aspect of the invention, it relates to a method for conveying a fluid for a substantial distance in a plurality of parallel pipe lines while preventing a phase separation from said fluid in said pipe lines by varying, when required, the pressure drop in said pipe lines, thus, to vary the turbulence therein, thereby preventing phase separation from the fluid therein, by varying the number of said parallel pipe lines and the extent to which each line being used is used. In still another aspect to the invention, it relates to an apparatus comprising a plurality of pipes connecting two points of a pipe line system, the pipes being adapted to be connected for parallel flow, and means for controlling the number of the parallel pipes connected for conveying fluid, thereby to control the turbulence in the pipes conveying fluid to prevent sedimentation, phase separation, or accumulation of fluid in the system. In still another aspect of the invention, it relates to increasing the turbulence in a pipe line system to prevent fluid accumulation therein, especially at low points, which comprises injecting, especially at a low point of the pipe line system, a pressuring fluid in a quantity sufficient to maintain a turbulence sufficient to prevent said fluid accumulation. Other aspects, as well as the advantages and operation of the invention and its several now preferred embodiments are apparent from a study of this disclosure, the drawings, and the appended claims.

It is well known that pipe lines conveying fluids, especially for substantial distances, are laid on or in the ground and follow substantially the contour of the ground. Thus, such pipes or lines convey fluids up the sides and down the sides of hills as well as through valleys. When a pipe line which crosses such hilly country conveys a fluid, such a mixture of gas and oil, a mixture of oil and water or a mixture of gas transporting a finely divided solid from which said water or solid may separate out as a phase, any separated phase will tend to accumulate at low points in the pipe line. Whenever sufficient accumulation at low points has occurred, there is experienced an undesirable surging in the system and this surging may be sufficient to cause complete interruption of flow for conveying of the fluid. Furthermore, fluid, or product, received at the discharge end of the pipe line system, or even taken therefrom at points intermediate its ends, will not be obtained having a uniform composition, which can be undesirable in most instances.

Among the principal objects of the invention are the provision of a method and a means for conveying a fluid in a pipe line system in a manner to prevent phase separation and/or accumulation in the system by providing, in various manners, a turbulence sufficient to keep the contents of the pipe line sufficiently mixed so that regardless of the character of the fluid or materials which may be contained in said fluid, which materials may even include solids, the contents of the pipe line will move as a mass, thus preventing such accumulation or phase separation. An especially important object of the invention is the deliberate use of a pipe line system or a system of several pipe lines or pipe line systems to convey immiscible fluids or mixtures of fluids and solids, for example, gas and oil being gathered and conveyed to a central separation and stabilization unit. Thus, the invention has as an important object the conveying of multiphase fluids or substances.

According to the invention there have been provided a method and a means for adjusting or controlling the turbulence of a fluid moving in a pipe line or a pipe line system which comprises measuring the pressure drop between two points in said system and controlling said turbulence responsive to said pressure drop and maintaining said turbulence at a value sufficiently high to prevent phase separation or accumulation of fluids in said pipe line.

Also, according to the invention, there have been provided a method and an apparatus for subdividing into parallel streams a flow of fluid in a pipe line system between two points, for measuring pressure drop between said two points and for controlling the total cross-section of the flow of fluid between said points by controlling the number of said parallel streams being employed responsive to said pressure drop in a manner to cause a turbulence sufficient to prevent phase separation or accumulation in the system. In a preferred form of the invention not only is the number of parallel streams maintained at any given time controlled, but the extent to which each stream, which is carrying fluid, carries fluid is also controlled.

Also, according to the invention, there are provided a method and a means for conveying a fluid between two points in a pipe line system, in which phase separation or accumulation is substantially avoided, by injecting a pressurizing medium or fluid into said system at at least one point thereof to increase the turbulence therein responsive to pressure drop therein. In one preferred form of the invention the pressuring fluid is injected at a low point of the line or system.

In the drawings,

Figure 1 is a diagrammatic view of an apparatus for carrying out that form of the invention in which parallel streams of flow from one point to another in a pipe line system are employed.

Figure 2 is a diagrammatic showing of an apparatus in which there is injected at a low point in the system between two points in a pipe line a pressuring fluid.

Figure 3 is a diagrammatic showing of an electrical circuit adapted to be used with the apparatus or system of Figure 1.

Referring now to Figure 1, 2 is a main pipe line connecting points A and B and adapted for shipping a fluid, in this instance, a mixture of gas and oil, from point A in an oil field to processing point B at which place the oil is recovered substantially free from gas and the gas is recovered substantially free from oil. At a point of pipe line 2 near A and at a point of pipe line 2 near B there are provided pressure sensing and signaling elements 3 and 4 respectively. A signal receiving and comparing station 5 is connected by means of transmission lines 6 and 7 respectively to elements 3 and 4. Station 5 is connected by means of energy transmission lines 8, 9 and 10, respectively, to motor-driven valves 11, 12 and 13, disposed in parallel flow pipe lines 14, 15 and 16 which are connected in parallel flow with pipe line 2 by means of pipe lines 17 and 18. Energy transmission line 19 controls valve 20 in line 2. If flow will always be sufficient to require use of more than pipe 2 at all times, line 19 and valve 20 can be dispensed with. Similarly, any one or more of the pipes and cooperating valves, etc. can be dispensed with in a particular situation in which the said valves are not required. Dotted lines 21, 22 and 23 indicate that more than three additional or auxiliary parallel pipe lines can be employed in the system, according to the invention. However, for purposes of illustrating this embodiment of invention, reference will be made only to pipe lines 2, 14, 15 and 16 and their cooperating equipment. In operation, elements 3 and 4 will measure pressure drop between the points at which these elements are located. A cross-sectional area of each of the pipes being known and the pressures at the points at which elements 3 and 4 are located being signaled by way of lines 6 and 7 to station 5, the means within station 5 will act upon valves 11, 12, 13 and 20 in a manner to maintain and, if not then existing, to establish and to maintain a pressure drop predetermined to prevent phase separation of the oil and gas mixture being conveyed, that is, it being known by predetermination for the particular pipes the amount of oil and gas being conveyed and the proportions of oil to gas in the fluid being conveyed what shall be the pressure drop, station 5 is adjusted to open in the communication between points C and D only a sufficient cross-sectional area of piping to provide for adequate flow while providing a pressure drop sufficient to prevent phase separation or at least accumulation of liquid from the gas. It will be understood that at least one of pipes 2, 14, 15, 16 and any others in the system, can be conveying oil and gas through hilly country. Also it will be understood that station 5 can be adjusted to cause principal flow through, say, pipe 14 and an auxiliary flow through any of the other pipes, etc. The operation of station 5 and its correlated or cooperating elements such as elements 3 and 4, lines 6, 7, 8, 9, 10, etc., can be provided as shown in Telemetering by P. A. Borden and Thynell, Reinhold Publishing Company, pages 180 to 183. Essentially, the transmission of the signals from elements 3 and 4 to station 5 can be accomplished by way of fluid-filled pipes or electrically or otherwise, as desired. Also, in station 5, the signals can be set off each against the other and depending upon the absolute value of their difference, one or more relays can be operated to cause one or more of the energy transmission lines 8, 9, 10 and 19 to operate to open or to close respectively valves 11, 12, 13 and 20 or to maintain open to a greater or lesser extent any one or several of these valves.

More specifically, if the pressure differential between C and D is 100 pounds per square inch and the pressure at C is 200 and at D is 100 pounds per square inch, when operation is begun, as pump 21′ pumps at increasing rates, valve 20 being open, the pressure differential sensed by station 5 will increase and the station 5 will operate to relay energy supplied to it from energy source S into transmission line 8 to operate to open motor valve 11, thus, cutting into the system by way of pipes 17 and 18, pipe 14 establishing a flow parallel to pipe 2. The actual number of such valves as valves 11, 12, 13, etc., which are opened will depend upon the total increase of the pressure differential sensed at 5 which, therefore, will maintain the total pressure differential at substantially 100 pounds per square inch. According to the invention, it is possible to adjust station 5 to take into account only values of pressure differential of, say, 10, 20 or even more pounds per square inch, thus avoiding constant operation of the station due to pumping surges or other slight variations in pressure drop which may momentarily exist.

It will be noted that by varying the total or over-all cross-section of the pipes available for parallel flow, the velocity of travel of any particular portion of the gas and oil mixture can be maintained at any desired value, thus controlling its turbulence.

It is especially noteworthy that the plurality of pipes or conduits shown in Figure 1 might be supplied by existing pipe lines which connect at at least two geographical points. Thus, in executing this embodiment of the invention, it is not necessarily required to lay, de novo, parallel pipe lines. Clearly, although the pipe lines are shown in Figure 1 to be laid parallel to each other, it will be understood by one skilled in the art in possession of this disclosure that the flows are intended to be parallel in the sense that they emanate from a point and are collected at a point. The particular configuration of any particular line in the plurality of lines is clearly unimportant.

Referring now to Figure 2 in which elements which are the same as in Figure 1 bear identical identifying numbers, responsive to the pressure differential sensed at station 5, motor valve 25 is opened by energy transmitted thereto by way of transmission line 26, to introduce, by way of conduit 27, pressuring fluid into the oil and gas mixture passing through pipe line 2. The pressuring fluid is introduced into line 2 at point C which is a low point in the system. It will be understood that point C need not be a low point in the system. It is sufficient if at point C there is introduced sufficient additional gas to provide in the pipe line a sufficient pressure drop to maintain a turbulence sufficient to prevent phase separation. It will be understood that it is within the scope of the invention to provide additional pressuring means which are indicated in the drawing by dotted lines 26′ and 27′ and motor valve 25′.

It will be apparent to one skilled in the art in possession of this disclosure that lines such as line 27 can be gas collecting lines in a gas field feeding their gas to an oil transmission line in which event the modus operandi of the invention is employed whenever the turbulence is maintained by supplying a sufficient amount of gas to the oil transmission line to prevent phase separation.

It will be evident that a characteristic common to the embodiments here set forth is the control of the ratio of the effective sizes of pipe or pipes to the quantity of fluid being conveyed in order to maintain a high velocity turbulent flow at all times to prevent liquid or other phase separation and/or accumulation.

To further explain the utility of the modification shown in Figure 1, the following example has been computed from data shown in published literature and text books. Assuming that the distance from C to D is 1000 feet and that the elevation drop between C and D is 100 feet vertical, i.e., there is a valley between C and D the bottom of which is 100 feet below points C and D. If the main feed line 2 has a capacity of 400 barrels per day delivered point C with gas in the amount of 1000 cubic feet per barrel, the pressure at D can be calculated. The size of the main line before the point C and after the point D may be of various sizes to supply the quantity of fluid desired. In making this calculation, the individual auxiliary lines are assumed to be 1 inch in diameter and there are 10 auxiliary lines connecting C and D 1000 feet in length. The different auxiliary lines may each have different diameters but all are considered to be of the same diameter here to simplify calculations. It can be readily seen that the operating capacity of each individual line thus would be 40 barrels of oil per day plus 40,000 cubic feet of gas per day. The pressure drops to be expected in the auxiliary lines if they were in a horizontal plane carrying the above would be 10 lbs. per square inch. An exact method of evaluation of the pressure drop due to liquid accumulation is not known; however, it is reasonable to assume that an upper limit for this additional pressure drop will be approximately 37 p.s.i. corresponding to the case of having a vertical column of 100 ft. full of oil segregated from gas. This figure is approximate since it assumes that all of the gas particles are separated from the liquid particles and the liquid particles have accumulated throughout the lines. When the liquid has accumulated in accordance with this invention, one or more of the auxiliary lines are cut out of the fluid circuit, thus increasing the speed or turbulence of flow through the remaining auxiliary lines which will remove the accumulated liquid. In the present instance if the number of lines is reduced from 10 to 5 the pressure drop calculated for horizontal flow will be about 38 pounds per square inch thus resulting in an increase of 28 p.s.i. over the previous horizontal flow pressure drop which was calculated to be 10 p.s.i. Since half of the lines were cut out, each flowing line will have to double its capacity, and therefore, double flow velocity and increase the turbulence. In accordance with this invention, this increase in turbulence of flow will remove and/or prevent the accumulation of oil in the lower sections of the line, lowering the pressure drop caused by this accumulation through the lines and thus permit the opening of the valves in the closed five lines making a total of 10 lines during which the pressure drop from C to D is brought back to 10 lbs. per square inch per line.

In the second embodiment as shown in Fig. 2, an example with a dip of 100 feet between points 3 and 4 which are 1000 feet apart will serve for illustrative purposes. The example computed from published tables shows a delivery of 26,000 pounds of fluid per day at 4 through a three inch pipe to be feasible. The 26,000 pounds of fluid is made up approximately of oil flowing at the rate of 80 barrels per day and gas amounting to 1000 cubic foot per barrel of oil. This means the delivery of 80,000 cubic foot of gas and 80 barrels of oil per day. If it is assumed that the density of the flowing gas and oil mixture is 30 lbs./cu. ft.; on the basis of above figures calculations made by the gas-lift method for the limiting case of upward and vertical flow indicate the pressure drop to be approximately equal to 24 pounds per square inch. If the flow rate is such as to allow the oil to slip and accumulate the pressure drop could become as high as 37 pounds per square inch under the above conditions. Before such pressure drop reached this figure the differential pressure at the comparing station 5 would operate a valve to cause injection of gas at the low point of the line. Gas can be injected at a rate to increase the delivery at 4 from 26,000 pounds to 40,000 pounds per day. This increase in quantity is obviously accompanied by a decrease in density of the fluid due to gas, the input at 3 being uniform as to the start, resulting in a pressure drop to approximately 19 pounds per square inch due to the 100 foot elevation. This will cause an increase in velocity and turbulence of the fluid and thus reduce pressure drop due to liquid hold up. After the pressure differential has become corrected the injection gas would be shut off entirely or reduced.

To accomplish the above differential type pressure sensing devices at 3 and 4 can be used with the device at 3 having an upper and lower electrical contact to turn on and off the injection gas. When the differential pressure reaches a predetermined level the injection gas is turned on by a control motor valve, and when the differential pressure drops below a certain value the injection gas is turned off.

Figure 3 shows a simplified circuit diagram for carrying out the modification of this invention shown in Fig. 1. In Fig. 3, Bourdon tube pressure responsive switches are used at 3 and 4 and shown as 40, 37, 38 and 39. The pressure responsive switches are of the type shown in Patent No. 2,043,441, and contain an indicating and pressure setting mechanism on their face. Pressure switch 40 is the downstream pressure sensing device while 37, 38 and 39 are the upstream pressure sensing devices. Clearly, one pressure switch containing a plurality of switches which operate at different pressures can be used in place of 37, 38 and 39 but three are shown at 3 for simplification purposes. During the operation of this invention when the downstream pressure at D exceeds say 10 p.s.i., device 40 operates its electrical switch completing a circuit through battery 41, lead 7, relay switch 33 in comparing station box 5, lead 32, through sensing switch device 39 and lead 42. In a field installation lead 42 would pass through station 5 for convenience or would be ground. It is obvious that this circuit is not completed unless the pressure sensing device 39 at C exceeds a predetermined value which in this case is 20 p.s.i. When this pressure has been reached at the upstream side, switch 39 or the like is closed causing relay switch 33 to operate to the position shown in Fig. 3 resulting in solenoid valve 11 closing, when switch $S_1$ has been previously closed manually. Switches $S_1$, $S_2$, $S_3$, $S_4$, etc., are closed manually before this control system is put into operation. Also, switch 36 is normally placed in the right hand or position manually to cause valve 20 to be open as shown. Should the pressure on the upstream side of this control system increase exceed 30 pounds per square inch pressure above that at 4, pressure sensing device 38 operates to close its switch completing the circuit from 40, battery 41, lead 7, relay switch 34, lead 31, pressure sensing device 38, and lead 42. Switch 34 is shown in the lefthand position which means that solenoid valve 12 is open (i.e. before the closing of sensing switch 38). Solenoid valve 13 is also shown as opened since relay switch 35 is in the lefthand position. When the upstream pressure exceeds 40 p.s.i. or any other set predetermined value, sensing device 37 switch is closed completing a circuit through relay switch 35 causing solenoid valve 13 to close. The above description relates to the situation where the upstream pressure is constantly increasing due to the back pressure developing by accumulation of fluid in the low sections of the tubes. By the closing of the valves in the different auxiliary lines increased fluid is forced through the remaining lines at a higher velocity and greater turbulence thus removing accumulated fluid which may have settled to the lower sections. Should the upstream pressure begin to decrease when the accumulated fluid has become blown out of the tubes due to increased velocity and turbulence created by closing successive valves, say, drop below 40 p.s.i., sensing device 37 is opened causing relay switch 35 to move to the right side as shown resulting in solenoid valve 13 being opened. Likewise, as the pressure drops off from 40 lbs. to 30 lbs. to 20 lbs., switches 34 and 33 open causing solenoid valves 12 and 11 to open successively, one after the other. These valves will remain open as long as the upstream pressure does not exceed the pressure differential of 10 p.s.i., i.e. 10 lbs. greater than the downstream pressure reading. At all times, when fluid is flowing through this system, and the differential pressure is below a predetermined value, it is to be understood that all valves 13, 12, 11, etc., remain open. Under this condition no fluid is considered as accumulating in the auxiliary lines to cause an increase in pressure differential.

The wiring diagram shown in Fig. 3 is only one example of the various means for carrying out this invention. Clearly, other types of pressure operated switches are usable and available. Other electrical relays, servo system, etc., can be used which will open the valves gradually rather than in an on-off fashion. Air of hydraulic operated systems may be used to open and close the valves. The Bourdon tube pressure sensing devices on the upstream side of this control system clearly could be operated by one Bourdon tube instead of three similar to the system shown in Fig. 3 of Patent No. 2,515,879. The auxiliary lines 14, 15, 16, etc., may have different diameters depending upon the requirements. One small auxiliary line might parallel one larger section of pipe line and accomplish the same objective as a plurality of parallel lines.

Reasonable variation and modification are possible within the scope of the foregoing disclosure, drawing, and the appended claims to the invention, the essence of which is that there have been provided a method and a means for measuring pressure drop between two points of a pipe line conveying a multiphase fluid and adjusting said pressure drop, especially as described herein, so as to maintain a pressure differential predetermined to cause a turbulence of said fluid sufficient to prevent phase separation and/or accumulation in said pipe line.

We claim:

1. In the transmission of a fluid through a pipe line for a substantial distance, a method for preventing a separation of a phase from said fluid which comprises, between two points between which phase separation is to be avoided, subdividing said fluid into a plurality of streams which are caused to flow through individual pipes and recombining said streams at the downstream end of said points, measuring the pressure at each of two points in said pipe line which encompass between them a plurality of streams thus determining the pressure drop between said points and adjusting said pressure drop to a predetermined value sufficient to maintain a desired turbulence of the subdivided streams by decreasing the number of subdivided streams employed until said pressure drop value has been obtained, whenever the measured pressure drop has been found to be lower than the said predetermined pressure drop and vice versa.

2. In the transmission of a fluid in a pipe line system in which sedimentation or other phase separation tends to occur, especially at low points in such a system, the steps in combination which comprise measuring the pressure at each of two points in said pipe line thus determining the pressure drop between said two points in said pipe line and introducing into said line between said points a pressuring fluid in an amount sufficient to accomplish a pressure drop predetermined to cause a turbulence sufficient in said line to prevent a phase separation between said points.

3. A pipe line system comprising a main pipe line between a shipping point and a receiving point, a pressure-sensing element operatively connected to the pipe line at each of said points, each of said sensing elements being adapted to convey to a control point a signal representative of a measured pressure at each of said points, at least one additional pipe adapted to handle flow of fluid in parallel to said pipe line between said pressure-sensing elements, means for placing into communication with the system said additional pipe, control means located at a control point to control said means for placing into communication said additional pipe, and means for connecting operatively to said control means the signals representing the pressures at said points, said control means being adapted to cut in and out of the system the said additional pipe responsive to the difference in the pressures being sensed by said pressure-sensing elements.

4. In the transmission of a multiphase fluid in a pipe line system in which sedimentation or other phase separation tends to occur, especially at low points in the system, the steps in a combination for maintaining turbulent flow sufficient to counteract phase separation in the system which comprises measuring the pressure at two points in said pipe line removed a substantial distance each from the other, and maintaining between said two points in said system a pressure drop sufficient to cause a turbulence predetermined to prevent in said system said phase separation, while transmitting said multiphase fluid therein, by conveying said fluid in a plurality of lines between said two points and wherein the desired turbulence to prevent phase separation is accomplished by removing from use a sufficient number of said lines when the pressure drop is insufficient to maintain the desired turbulence and vice versa.

5. In the transmission of a multiphase fluid in a pipe line for a substantial distance, the method of preventing a phase separation from said fluid which comprises conveying the same through a pipe line, measuring the pressure at two points in said pipe line removed a substantial distance each from the other thus determining the pressure drop along at least a portion of said pipe line and adjusting said pressure drop so as to maintain a pressure drop predetermined to cause a turbulence of said fluid in said pipe line sufficient to prevent said phase separation by varying the total cross-section in use of a plurality of parallel pipe lines through which the fluid is conveyed in parallel streams.

6. In a transmission of a multiphase fluid in a pipe line for a substantial distance, the method of preventing a phase separation from said fluid which comprises conveying the same through a pipe line, measuring the pressure at two points in said pipe line removed a substantial distance each from the other thus determining the pressure drop along at least a portion of said pipe line and adjusting said pressure drop so as to maintain a pressure drop predetermined to cause a turbulence of said fluid in said pipe line sufficient to prevent said phase separation by injecting a secondary fluid at at least one low point thereof into said pipe line.

7. In a transmission of a multiphase fluid in a pipe line for a substantial distance, the method of preventing a phase separation from said fluid which comprises conveying the same through a pipe line, measuring the pressure at two points in said pipe line removed a substantial distance each from the other, thus determining the pressure drop along at least a portion of said pipe line and adjusting said pressure drop, responsive to the determined pressure drop, so as to maintain a pressure drop predetermined to cause a turbulence of said fluid in said pipe line sufficient to prevent said phase separation by injecting a secondary fluid at at least one low point thereof, into said pipe line.

8. In the transmission of a multiphase fluid in a pipe line system in which sedimentation or other phase separation tends to occur, especially at low points in the system, the steps in a combination for maintaining turbulent flow sufficient to counteract phase separation in the system, which comprises measuring the pressure at two points in said pipe line removed a substantial distance from each other and operating said system in response to changes in the measured pressure drop to maintain automatically between said two points in said system a predetermined pressure drop sufficient to cause a turbulence predetermined to prevent said phase separation in said system.

9. A method of transporting a multiphase fluid in a pipe line system comprising the steps of conveying said fluid through said pipe line, measuring the pressure at two points in said pipe line removed a substantial distance from each other, thus determining the pressure drop along at least a portion of said pipe line and adjusting said pressure drop responsive to changes in said pressure drop to maintain automatically a pressure drop predetermined to cause a turbulence of said fluid in said pipe line to prevent said phase separation.

10. In the transmission of a multiphase fluid in a pipe line system in which sedimentation or other phase separation tends to occur, especially at low points in the system, the steps in a combination for maintaining turbulent flow sufficient to counteract phase separation in the system, which comprises measuring the pressure at two points in said pipe line removed a substantial distance from each other and injecting a pressuring fluid responsive to changes in the measured pressure drop to maintain automatically between said two points in said system a pressure drop sufficient to cause a turbulence predetermined to prevent said phase separation in said system.

11. A method of transporting a multiphase fluid in a pipe line system comprising the steps of conveying said fluid through said pipe line, measuring the pressure at two points in said pipe line removed a substantial distance from each other, thus determining the pressure drop along at least a portion of said pipe line and injecting a secondary fluid into said pipe line to adjust said pressure drop responsive to changes in said pressure drop to maintain automatically a pressure drop predetermined to cause a turbulence of said fluid in said pipe line sufficient to prevent said phase separation.

References Cited in the file of this patent

UNITED STATES PATENTS

| | | |
|---|---|---|
| 1,108,721 | Dodge | Aug. 25, 1914 |
| 1,308,569 | Wylie | July 1, 1919 |
| 1,962,676 | Albright | June 12, 1934 |
| 1,962,678 | Johnson | June 12, 1934 |
| 2,050,020 | Schmidt | Aug. 4, 1936 |
| 2,504,081 | Mylting | Apr. 11, 1950 |
| 2,604,899 | Fitzgibbons | July 29, 1952 |
| 2,686,085 | Odell | Aug. 10, 1954 |